United States Patent
Niwa et al.

(10) Patent No.: US 9,889,828 B2
(45) Date of Patent: Feb. 13, 2018

(54) DECELERATION END LOCATION STORAGE SYSTEM, DRIVE ASSIST SYSTEM, DRIVE ASSIST METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Toshiaki Niwa, Anjo (JP); Takashi Fukukawa, Toyota (JP); Tomoki Kodan, Toyota (JP); Kuniaki Tanaka, Toyota (JP)

(73) Assignees: AISIN AW CO., LTD., Anjo-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/774,475

(22) PCT Filed: Mar. 3, 2014

(86) PCT No.: PCT/JP2014/055241
§ 371 (c)(1),
(2) Date: Sep. 10, 2015

(87) PCT Pub. No.: WO2014/156482
PCT Pub. Date: Oct. 2, 2014

(65) Prior Publication Data
US 2016/0039395 A1 Feb. 11, 2016

(30) Foreign Application Priority Data
Mar. 29, 2013 (JP) .................................. 2013-074880

(51) Int. Cl.
*B60T 7/12* (2006.01)
*B60T 13/74* (2006.01)
(Continued)

(52) U.S. Cl.
CPC ................ *B60T 7/12* (2013.01); *B60T 13/74* (2013.01); *B60W 30/18109* (2013.01);
(Continued)

(58) Field of Classification Search
CPC ..... B60W 30/18109; B60W 30/18154; B60W 2050/0089; B60W 2550/14;
(Continued)

(56) References Cited

U.S. PATENT DOCUMENTS

2009/0319126 A1\* 12/2009 Miyajima .......... B60K 31/0066
701/41

FOREIGN PATENT DOCUMENTS

JP 2009-053732 A 3/2009
JP 2009053732 A \* 3/2009
(Continued)

*Primary Examiner* — Nga X Nguyen
(74) *Attorney, Agent, or Firm* — Sughrue Mion, PLLC (57) ABSTRACT

There are provided a deceleration end location storage system that can appropriately store a deceleration end location at which a vehicle ends deceleration in decelerating action even for a road on which the content of the decelerating action tends to vary because of a disturbance such as a road with a large amount of traffic, and a drive assist system, a drive assist method, and a computer program that can provide appropriate drive assistance for a vehicle on the basis of stored deceleration end locations. In the case where a vehicle performs decelerating action, a deceleration end location at which the vehicle ends deceleration in the decelerating action is specified. A variation range that matches the road type of a road on which the deceleration end location is provided is set. In the case where learning (Continued)

data stored in a learning DB 32 already include learning data for a different deceleration end location provided within the variation range set from the present deceleration end location, such deceleration end locations are stored as learning data for the same deceleration end location.

9 Claims, 7 Drawing Sheets

(51) Int. Cl.
*G01C 21/34* (2006.01)
*G05D 1/00* (2006.01)
*G06N 99/00* (2010.01)
*G08G 1/00* (2006.01)
*G08G 1/0967* (2006.01)
*B60W 30/18* (2012.01)
*G01C 21/26* (2006.01)
*B60W 50/00* (2006.01)

(52) U.S. Cl.
CPC ... *B60W 30/18154* (2013.01); *G01C 21/3407* (2013.01); *G05D 1/0055* (2013.01); *G06N 99/005* (2013.01); *G08G 1/00* (2013.01); *G08G 1/096716* (2013.01); *B60W 2050/0089* (2013.01); *B60W 2550/14* (2013.01); *B60W 2550/20* (2013.01); *G01C 21/26* (2013.01)

(58) Field of Classification Search
CPC ............ B60W 2550/20; G06N 99/005; G08G 1/096716; G08G 1/00; B60T 7/12; B60T 13/74; G01C 21/3407; G01C 21/26; G05D 1/0055
USPC .......................................................... 701/70
See application file for complete search history.

(56) References Cited

FOREIGN PATENT DOCUMENTS

| | | |
|---|---|---|
| JP | 2011-098690 A | 5/2011 |
| JP | 2011-227833 A | 11/2011 |
| JP | 2012-117938 A | 6/2012 |
| WO | 2012/039026 A1 | 3/2012 |

* cited by examiner

LEARNING DB 32

| LINK ID | TRAVEL DIRECTION | DECELERATION END LOCATION |
|---|---|---|
| 10001 | UPBOUND | (x1,y1) |
|  | UPBOUND | (x2,y2) |
|  | UPBOUND | (x3,y3) |
| 10003 | DOWNBOUND | (x4,y4) |
|  | DOWNBOUND | (x5,y5) |
|  | DOWNBOUND | (x6,y6) |
| ... | ... | ... |

D ≤ VARIATION RANGE: TO BE STORED AS SAME DECELERATION END LOCATION
D > VARIATION RANGE: TO BE STORED AS DIFFERENT DECELERATION END LOCATION, OR TO BE DETERMINED AS IRREGULAR DECELERATING ACTION AND NOT TO BE STORED

FIG. 11

DECELERATION END LOCATION STORAGE SYSTEM, DRIVE ASSIST SYSTEM, DRIVE ASSIST METHOD, AND COMPUTER PROGRAM

CROSS REFERENCE TO RELATED APPLICATIONS

This application is a National Stage of International Application No. PCT/JP2014/055241 filed Mar. 3, 2014, claiming priority based on Japanese Patent Application No. 2013-074880 filed Mar. 29, 2013, the contents of all of which are incorporated herein by reference in their entirety.

TECHNICAL FIELD

The present subject matter relates to a deceleration end location storage system that stores a deceleration end location at which a vehicle ends deceleration in decelerating action, and a drive assist system, a drive assist method, and a computer program that provides drive assistance for a vehicle on the basis of stored deceleration end locations.

BACKGROUND ART

Hitherto, there have been proposed drive assist systems that acquire various information related to travel of a vehicle such as road information obtained from map data and the current position specified by a GPS, a vehicle speed sensor, etc. to provide drive assistance by providing notice to a driver and helping the driver in driving. As one of such drive assist systems, there has been proposed a system that provides drive assistance in decelerating a vehicle such that the vehicle can decelerate to an appropriate speed at an appropriate degree of deceleration, particularly at a location at which the vehicle decelerates such as before an intersection or a curve.

For example, Japanese Patent Application Publication No. 2011-227833 (JP 2011-227833 A) discloses a technology for specifying a travel pattern of a vehicle by using a travel history (specifically, the timing to apply a brake) of the vehicle in the past as learning data to provide drive assistance such as deceleration guidance such that the vehicle travels along the specified travel pattern.

RELATED-ART DOCUMENTS

Patent Documents

[Patent Document 1] Japanese Patent Application Publication No. 2011-227833 (JP 2011-227833 A) (FIGS. 3 to 6)

SUMMARY OF THE INVENTION

Figure 11:
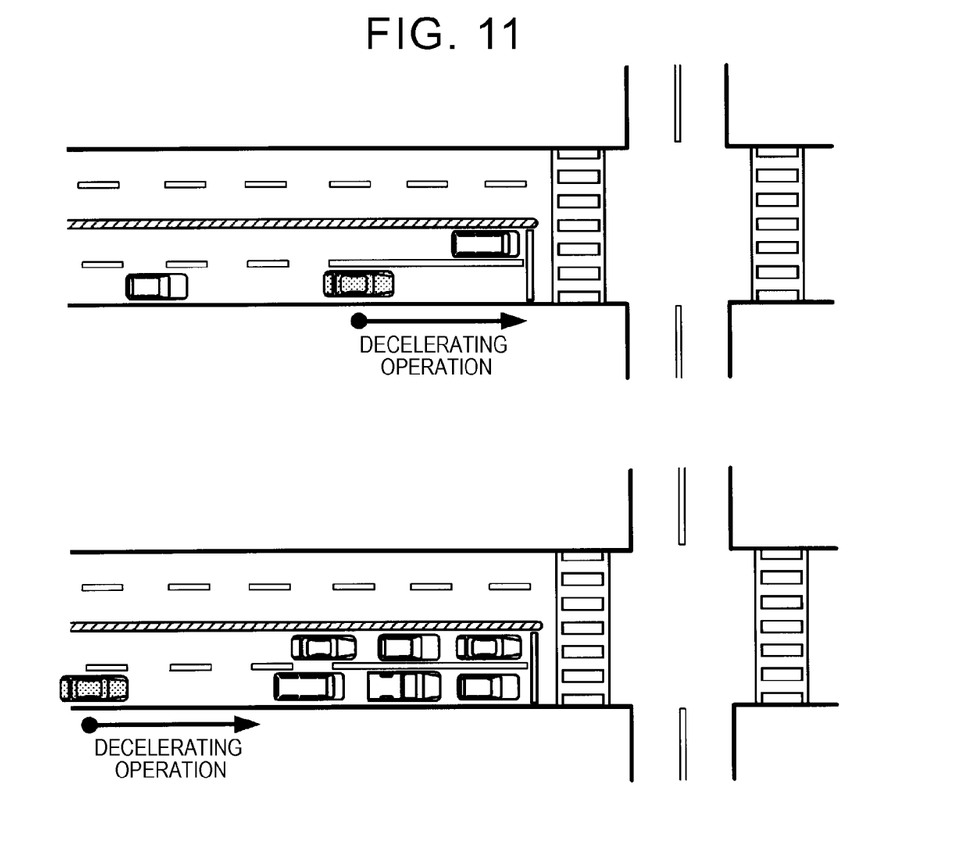
FIG. 11 illustrates an issue in providing drive assistance according to the related art.

With the technology described in Patent Document 1, however, a travel pattern may not be specified because of a disturbance (such as the presence or absence of a preceding vehicle, for example) on a road with a large amount of traffic, as a result of which appropriate drive assistance may not be provided. For example, on a road with a large amount of traffic, there may be a large number of preceding vehicles waiting at the traffic signal when the traffic signal turns red as illustrated in FIG. 11. Thus, the vehicle performs deceleration control near the stop line in some cases, and performs deceleration control at a position away from the stop line in other cases. Thus, in the situation illustrated in FIG. 11, the timing to apply a brake, which is to be learned, may significantly differ each time the vehicle travels even on the same road in the same direction, and a travel pattern may not be specified with the technology described in Patent Document 1.

The present subject matter has been made to address the foregoing issue of the related art, and therefore has an object to provide a deceleration end location storage system that can appropriately store a deceleration end location at which a vehicle ends deceleration in decelerating action even for a road on which the content of the decelerating action tends to vary because of a disturbance such as a road with a large amount of traffic, and a drive assist system, a drive assist method, and a computer program that can provide appropriate drive assistance for a vehicle on the basis of stored deceleration end locations.

In order to achieve the foregoing object, the present subject matter provides a deceleration end location storage system (1) including: decelerating action detection module (13) for detecting decelerating action of a vehicle; deceleration end location specifying module (13) for specifying a deceleration end location at which the vehicle ends deceleration in the detected decelerating action; and deceleration end location storage unit (13) for storing the specified deceleration end location, in which: the deceleration end location storage unit searches for a different deceleration end location provided within a predetermined range from the specified deceleration end location from deceleration end locations which have already been stored in the case where the deceleration end location is specified, and stores the specified deceleration end location as the same deceleration end location as the different deceleration end location in the case where there is any different deceleration end location found within the predetermined range as a result of the search; and the predetermined range is set to different ranges depending on a road type of a road on which the specified deceleration end location is provided.

The phrase "store a deceleration end location" may refer to storing the position coordinate of a location that suggests the position of the deceleration end location (e.g. a location a certain distance before or ahead in the travel direction from the deceleration end location) in addition to storing the position coordinate of the deceleration end location itself.

The present subject matter also provides a drive assist system that provides drive assistance for a vehicle that decelerates, a drive assist method for providing drive assistance for a vehicle using the system, and a computer program that causes the system to implement the following components. Specifically, the drive assist system: decelerating action detection module (13) for detecting decelerating action of a vehicle; deceleration end location specifying module (13) for specifying a deceleration end location at which the vehicle ends deceleration in the detected decelerating action; deceleration end location storage unit (13) for storing the specified deceleration end location; target setting module (13) for setting, for a road, a deceleration end target location which is a deceleration end location determined as a target when the vehicle performs decelerating action on the basis of a history of stored deceleration end locations; and drive assist (13) for providing drive assistance for the vehicle such that the vehicle ends deceleration at the deceleration end target location in the case where the deceleration end target location is provided ahead in a travel direction of the vehicle. The deceleration end location storage unit searches for a different deceleration end location provided within a predetermined range from the specified deceleration end location from deceleration end locations which have already been stored in the case where the deceleration end location is specified, and stores the specified deceleration end location as the same deceleration end location as the different deceleration end location in the case where there is any different deceleration end location found within the predetermined range as a result of the search. The predetermined range is set to different ranges depending on a road type of a road on which the specified deceleration end location is provided. The target setting module sets the deceleration end target location on the basis of the history of deceleration end locations stored as the same deceleration end location.

The phrase "ahead in the travel direction" may refer to a range ahead in the travel direction of the vehicle along a road along the way to be followed by the vehicle, and may refer to a range within a predetermined angle with respect to the travel direction of the vehicle regardless of the route. In the case where a route for guidance is set, further, the phrase may refer to a range ahead in the travel direction of the vehicle along the route for guidance.

The phrase "provide drive assistance" may include providing display guidance or audio guidance in addition to performing control related to drive such as acceleration and deceleration of the vehicle.

With the deceleration end location storage system according to the present embodiment configured as described above, it is possible to appropriately store a deceleration end location at which a vehicle ends deceleration in decelerating action, while eliminating irregular decelerating action, even for a road on which the content of the decelerating action tends to vary because of a disturbance such as a road with a large amount of traffic.

With the drive assist system, the drive assist method, and the computer program according to the present embodiment, it is possible to appropriately store a deceleration end location at which a vehicle ends deceleration in decelerating action as learning data, while eliminating irregular decelerating action, even for a road on which the content of the decelerating action tends to vary because of a disturbance such as a road with a large amount of traffic. In addition, a deceleration end target location is set on the basis of a history of deceleration end locations stored as the same deceleration end location, and drive of the vehicle is assisted such that deceleration of the vehicle ends at the deceleration end target location. Thus, it is possible to set a deceleration end target location to an appropriate position on the basis of learning data even for a road on which the content of the decelerating action tends to vary because of a disturbance such as a road with a large amount of traffic. As a result, the vehicle can be decelerated to an appropriate speed at an appropriate degree of deceleration without being accelerated or decelerated abruptly. For hybrid vehicles and EV vehicles, in particular, the battery can be charged efficiently through regenerative braking.

DESCRIPTION OF THE PREFERRED EMBODIMENTS

Figure 1:
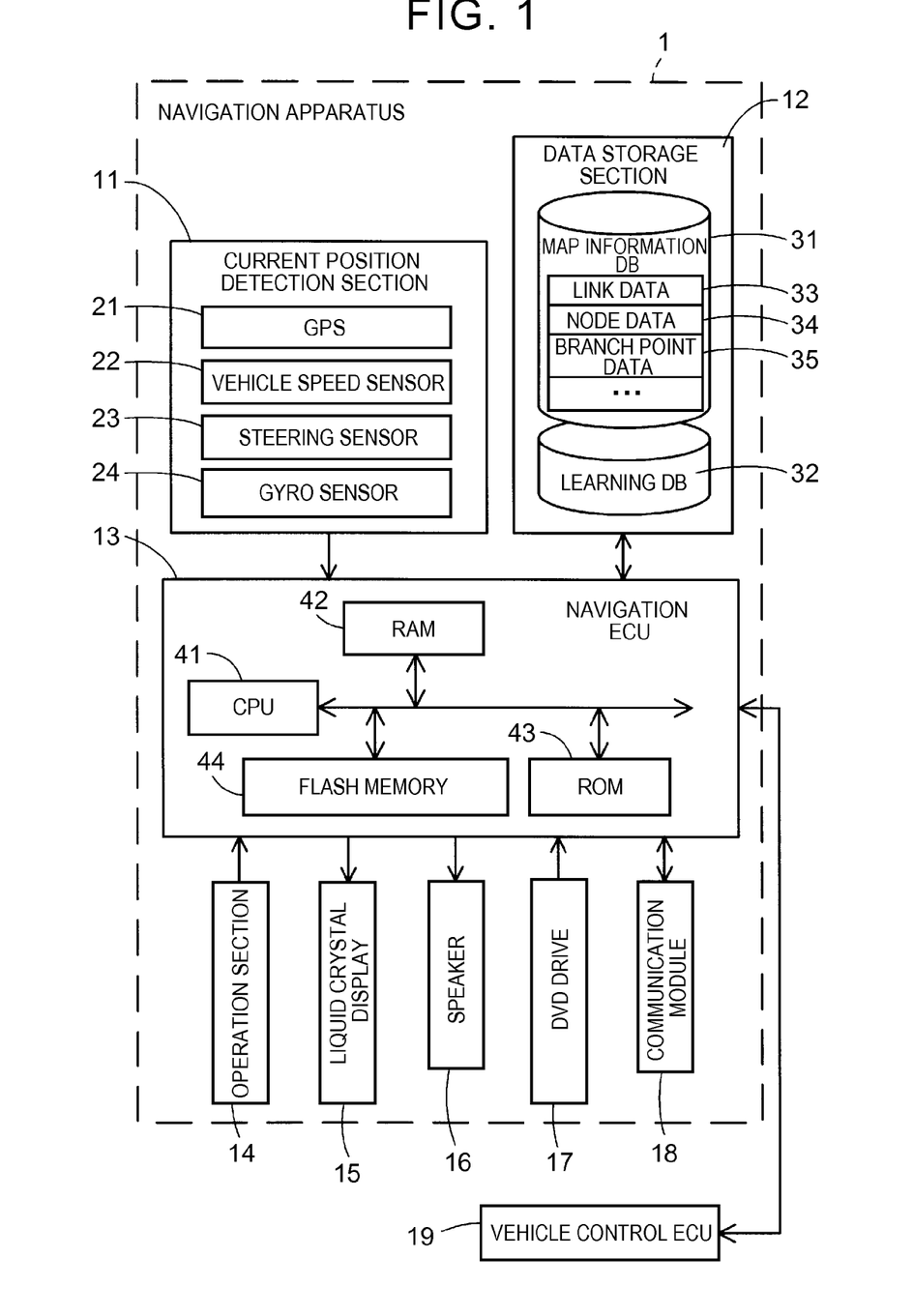
FIG. 1 is a block diagram illustrating a navigation apparatus according to an embodiment.

A deceleration end location storage system and a drive assist system, embodied as a navigation apparatus, according to an embodiment will be described in detail below with reference to the drawings. First, a schematic configuration of a navigation apparatus 1 according to the embodiment will be described with reference to FIG. 1. FIG. 1 is a block diagram illustrating the navigation apparatus 1 according to the embodiment.

As illustrated in FIG. 1, the navigation apparatus 1 according to the embodiment is composed of: a current position detection section 11 that detects the current position of the vehicle on which the navigation apparatus 1 is mounted; a data storage section 12 that stores various data; a navigation ECU 13 that performs various computation processes on the basis of input information; an operation section 14 that receives an operation from a user; a liquid crystal display 15 that displays a map of an area around the vehicle and facility information on facilities to the user; a speaker 16 that outputs audio route guidance; a DVD drive 17 that reads a DVD that serves as a storage medium; and a communication module 18 that communicates with an information center such as a probe center and a VICS (registered trademark: Vehicle Information and Communication System) center. The navigation apparatus 1 is connected to a vehicle control ECU 19 that performs various control for the vehicle on which the navigation apparatus 1 is mounted via an in-vehicle network such as a CAN in a mutually communicable manner.

The constituent elements of the navigation apparatus 1 will be described below in order.

The current position detection section 11 is composed of a GPS 21, a vehicle speed sensor 22, a steering sensor 23, a gyro sensor 24, and so forth, and can detect the current position of the vehicle, the orientation, the travel speed of the vehicle, the current time, and so forth. In particular, the vehicle speed sensor 22 is a sensor for detecting the travel distance of the vehicle and the vehicle speed, and generates pulses in accordance with rotation of the drive wheels of the vehicle to output a pulse signal to the navigation ECU 13. The navigation ECU 13 counts the generated pulses to calculate the rotational speed of the drive wheels and the travel distance. It is not necessary that the navigation apparatus 1 should include all of the four sensors, and the navigation apparatus 1 may be configured to include only one or some of such sensors.

The data storage section 12 includes: a hard disk (not illustrated) that serves as an external storage device and a storage medium; and a recording head (not illustrated) that serves as a driver that reads a map information DB 31, a learning DB 32, a predetermined program, and so forth stored in the hard disk and writes predetermined data into the hard disk. The data storage section 12 may be constituted of a memory card or an optical disk such as a CD or a DVD in place of the hard disk.

The map information DB 31 is a storage unit for storing link data 33 on roads (links), node data 34 on node points, branch point data 35 on branch points, location data on locations such as facilities, map display data for displaying a map, exploration data for exploring for a route, search data for searching for a location, and so forth, for example.

The stored link data 33 include a link ID that identifies a link, an end-portion node information that specifies a node positioned at an end portion of the link, a road type of a road that constitutes the link, the number of lanes, the width of the lanes, and so forth, for example. The stored node data 34 include a node ID that identifies a node, the position coordinate of the node, connection-destination node information that specifies a connection-destination node to which the node is connected via a link, and so forth. The stored branch point data 35 include node information that specifies a node that forms a branch point (intersection), connected link information that specifies a link (hereinafter referred to as a connected link) connected to the branch point, branch-point shape information that specifies the shape (such as the number of links connected to the branch point and the connection angle, for example) of the branch point, and so forth.

Figure 2:
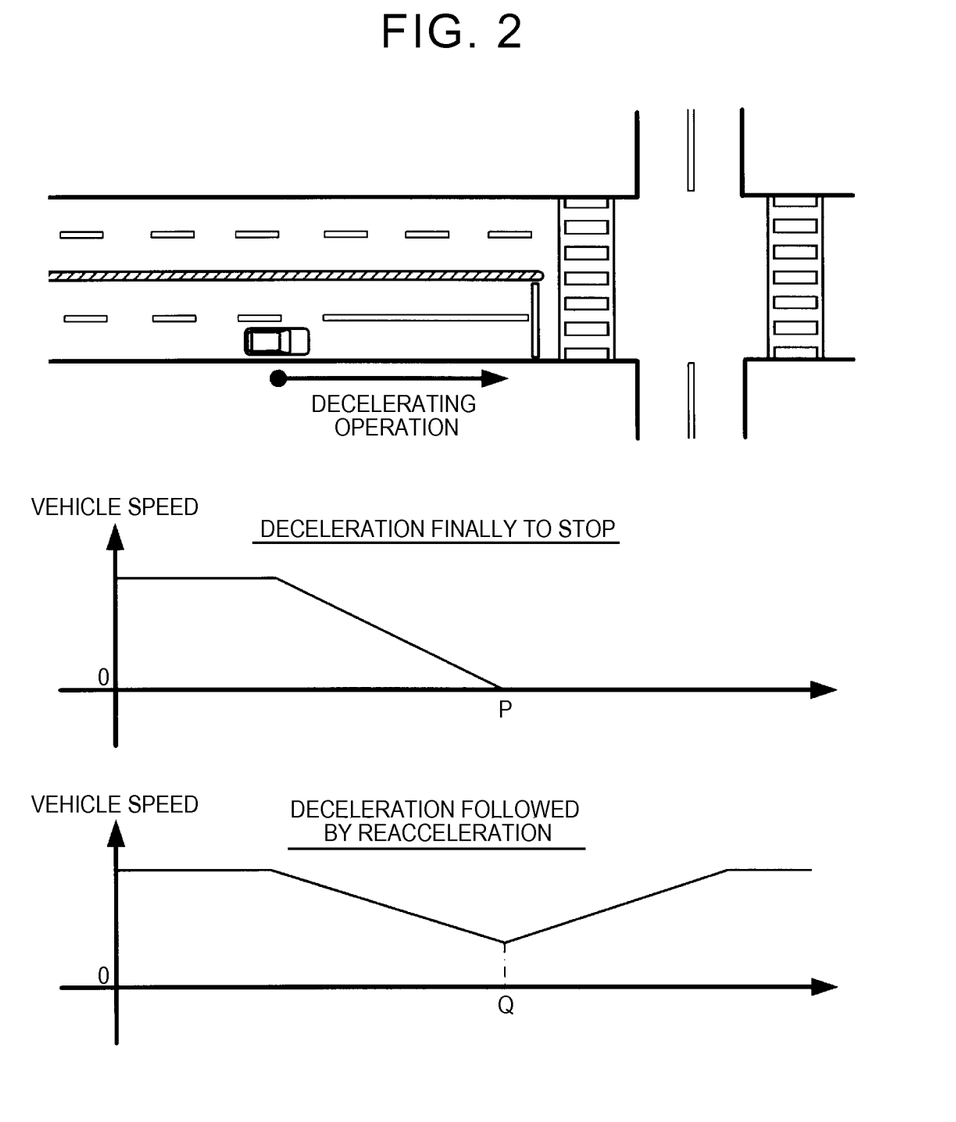
FIG. 2 illustrates a deceleration end location.

The learning DB 32 is a storage unit for storing learning data based on a travel history of the vehicle in the past. In the embodiment, the learning data stored in the learning DB 32 include a deceleration end location at which the vehicle ends deceleration when the vehicle performs decelerating action. More specifically, as illustrated in FIG. 2, the deceleration end location is a location P at which the vehicle is stopped in the case where the vehicle is finally stopped. Meanwhile, the deceleration end location is a location Q at which the vehicle is turned from deceleration into acceleration in the case where the vehicle accelerates without being finally stopped.

Figure 3:
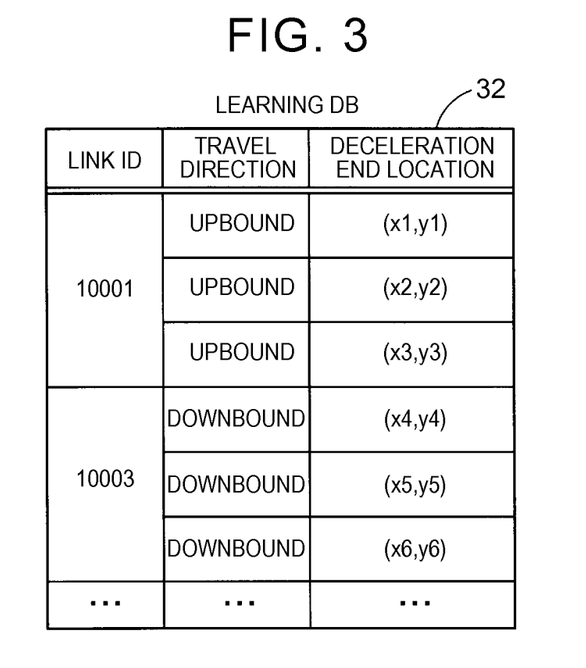
FIG. 3 illustrates an example of learning data stored in a learning DB.

FIG. 3 illustrates an example of the learning data stored in the learning DB 32. As illustrated in FIG. 3, the learning DB 32 stores the deceleration end location for each link and for each travel direction. The deceleration end location is stored cumulatively. In the case where the vehicle traveled along the same link and in the same direction a plurality of times in the past and performed decelerating action in each travel, deceleration control locations for the plurality of travels have been stored. A plurality of deceleration control locations stored for the same link and for the same direction rarely perfectly coincide with each other, and involve some variations. In the embodiment, as discussed later, deceleration end locations stored for the same link and for the same direction and positioned within a predetermined range are stored as learning data for the same deceleration end location even if they are not at the same location. Meanwhile, deceleration end locations positioned outside the predetermined range may be considered to be based on decelerating action based on a different factor or irregular decelerating action, and may be stored in the learning DB 32 as learning data for a different deceleration end location or may not be stored in the learning DB 32.

The navigation ECU 13 sets a deceleration end location (deceleration end target location) determined as the target when the vehicle performs decelerating action as discussed later using the position coordinate of the deceleration end locations stored as the same deceleration end location, and provides drive assistance for the vehicle such that the vehicle ends deceleration at the set deceleration end target location. The learning DB 32 may store a location a predetermined distance (e.g. 250 m) before the deceleration end location, rather than the deceleration end location. The location a predetermined distance before the deceleration end location prescribes a condition for starting to provide drive assistance for the vehicle, and drive assistance for deceleration control or the like is provided in the case where decelerating action is performed when the vehicle has passed the location.

The map information DB 31 and the learning DB 32 may be stored in an external server so that the navigation apparatus 1 updates or acquires data through communication.

The navigation ECU (electronic control unit) 13 is an electronic control unit that controls the entire navigation apparatus 1, and includes a CPU 41 that serves as a computation device and a control device, and internal storage devices such as a RAM 42 that is used as a working memory when the CPU 41 performs various computation processes and that stores route data etc. when a route is found, a ROM 43 that stores a control program, a drive assist process program (see FIG. 4) to be discussed later, and so forth, and a flash memory 44 that stores a program read from the ROM 43. The navigation ECU 13 constitutes various modules as process algorithms. For example, decelerating action detection module detects decelerating action of the vehicle. Deceleration end location specifying module specifies a deceleration end location at which the vehicle ends deceleration in the detected decelerating action. Deceleration end location storage unit stores the specified deceleration end location. Target setting module sets, for a road, a deceleration end target location which is a deceleration end location determined as the target when the vehicle performs decelerating action on the basis of a history of stored deceleration end locations. Drive assist provides drive assistance for the vehicle such that the vehicle ends deceleration at the deceleration end target location in the case where the deceleration end target location is provided ahead in the travel direction of the vehicle.

The operation section 14 is operated to input a departure location at which travel is started and a destination location at which travel is ended, and composed of a plurality of operation switches (not illustrated) such as various keys and buttons. The navigation ECU 13 performs control so as to execute various corresponding operation on the basis of a switch signal output in response to a depression of a switch or the like. The operation section 14 may be composed of a touch panel provided on the front surface of the liquid crystal display 15. The operation section 14 may be composed of a microphone and a speech recognition device.

The liquid crystal display 15 displays a map image including roads, traffic information, operational guidance, an operation menu, key guidance, an expected travel route from a departure location to a destination location, guidance information on a travel along the expected travel route, news, weather forecasts, the time, mails, television programs, and so forth.

The speaker 16 outputs audio guidance on a travel along a guide route and guidance on traffic information on the basis of an instruction from the navigation ECU 13.

The DVD drive 17 is a drive that can read data stored in a storage medium such as a DVD and a CD. Music and video is reproduced, the map information DB 31 is updated, etc. on the basis of the read data.

The communication module 18 is a communication device that receives traffic information composed of congestion information, restriction information, traffic accident information, and so forth transmitted from a traffic information center, e.g. the VICS (registered trademark) center and a probe center, and may be a cellular phone or a DCM, for example.

The vehicle control ECU 19 is an electronic control unit that controls the vehicle on which the navigation apparatus 1 is mounted. The navigation ECU 13 can acquire the vehicle state (such as the engine rotational speed, the speed ratio, and the accelerator operation amount, for example) on the basis of data acquired from the vehicle control ECU 19 via the CAN. In addition, the navigation ECU 13 transmits an instruction signal to the vehicle control ECU 19 via the CAN to perform deceleration control for the vehicle as discussed later by performing a downshift or applying a brake.

Figure 4:
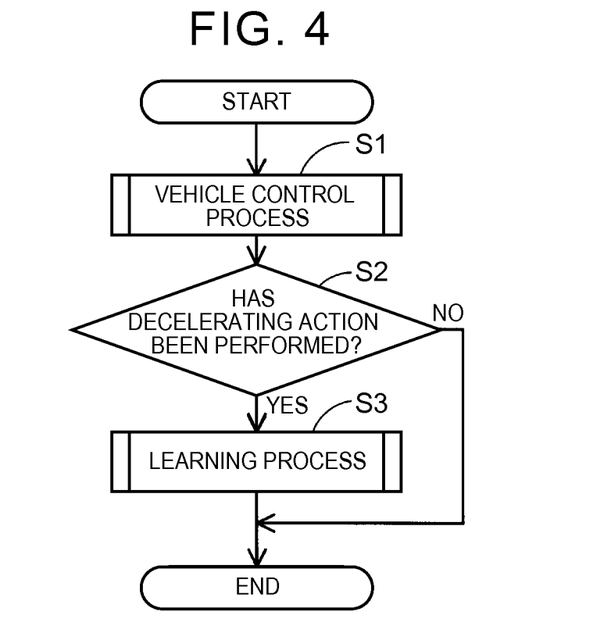
FIG. 4 is a flowchart of a drive assist process program according to the embodiment.

Subsequently, a drive assist process program executed by the navigation ECU 13 of the navigation apparatus 1 configured as described above will be described with reference to FIG. 4. FIG. 4 is a flowchart of the drive assist process program according to the embodiment. The drive assist process program is executed after ACC (Accessory power supply) of the vehicle is turned on to provide drive assistance related to deceleration of the vehicle on the basis of the learning results. The program illustrated in the flowchart of FIGS. 4, 5, and 8 described below is stored in the RAM 42 and the ROM 43 of the navigation apparatus 1, and executed by the CPU 41.

In the drive assist process program, first, in step (hereinafter abbreviated as "S") 1, the CPU 41 executes a vehicle control process (FIG. 5) to be discussed later. In the vehicle control process, a deceleration end location (deceleration end target location) determined as the target when the vehicle performs decelerating action is set on the basis of the learning data stored in the learning DB 32, and drive assistance for the vehicle is provided such that the vehicle ends deceleration at the set deceleration end target location.

Next, in S2, the CPU 41 determines on the basis of the result of the detection performed by the vehicle speed sensor 22 and vehicle information acquired from the vehicle control ECU 19 whether or not the vehicle has performed decelerating action. The decelerating action includes deceleration by engine braking in addition to deceleration by operating a foot brake. Thus, it is determined that the vehicle has performed decelerating action in the case where the accelerator is turned off to decelerate by engine braking even if the foot brake is not operated. It does not matter whether or not the vehicle is finally stopped.

In the case where it is determined that the vehicle has performed decelerating action (S2: YES), the process proceeds to S3. In the case where it is determined that the vehicle has not performed decelerating action (S2: NO), in contrast, the drive assist process program is ended.

In S3, the CPU 41 executes a learning process (FIG. 8) to be discussed later. In the learning process, the learning data stored in the learning DB 32 are updated on the basis of the decelerating action performed by the vehicle.

Figure 5:
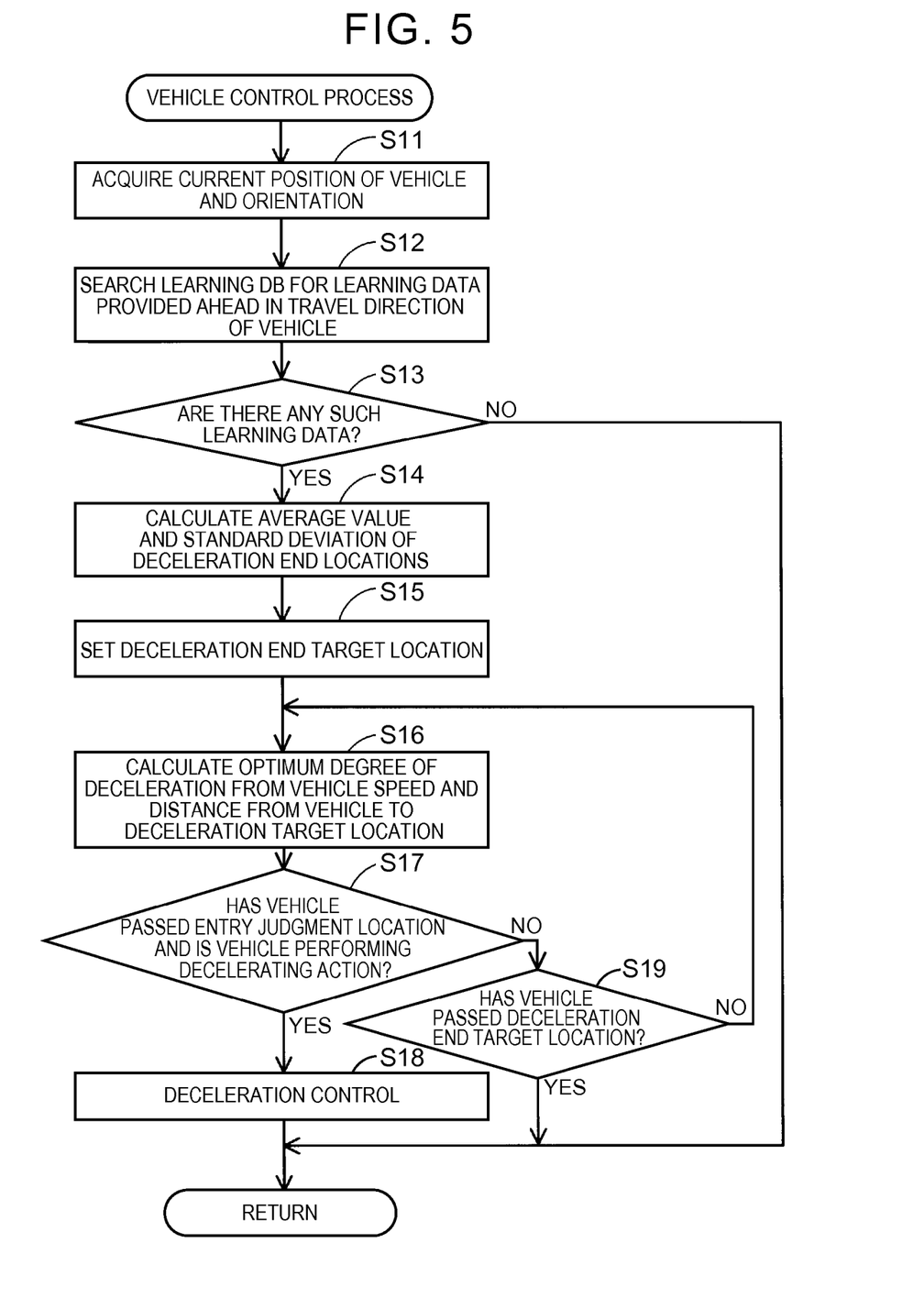
FIG. 5 is a flowchart of a sub process program of a vehicle control process according to the embodiment.

Next, a sub process of the vehicle control process executed in S1 will be described with reference to FIG. 5. FIG. 5 is a flowchart of a sub process program of the vehicle control process.

First, in S11, the CPU 41 acquires the current position of the vehicle and the orientation on the basis of the result of the detection performed by the current position detection section 11. A map matching process in which the current position of the vehicle is specified on map data is also performed. Further, it is desirable that the current position of the vehicle should be specified precisely using a high-precision location technique. In the high-precision location technique, white lines and road paint information taken from a camera provided in rear of the vehicle are detected through image recognition and further collated with a map information DB that stores white lines and road paint information in advance to detect the lane in which the vehicle is traveling and the precise vehicle position. The details of the high-precision location technique are already known in the art, and thus are not described herein.

Next, in S12, the CPU 41 searches for learning data provided within a predetermined distance (e.g. within 250 m) ahead in the travel direction of the vehicle, among the learning data stored in the learning DB 32, on the basis of the current position of the vehicle and the orientation acquired in S11. The learning data stored in the learning DB 32 include a deceleration end location at which the vehicle ends deceleration when the vehicle performs decelerating action (FIG. 3) as described above, and are stored or updated in the learning process (FIG. 8) to be discussed later. In S12, a search is made for learning data with a deceleration end location provided within a predetermined distance ahead in the travel direction of the vehicle.

Subsequently, in S13, the CPU 41 determines on the basis of the result of the search made in S12 whether or not there are any learning data with a deceleration end location provided within a predetermined distance ahead in the travel direction of the vehicle.

In the case where it is determined that there are any learning data with a deceleration end location provided within a predetermined distance ahead in the travel direction of the vehicle (S13: YES), the process proceeds to S14. In the case where it is determined that there are no learning data with a deceleration end location provided within a predetermined distance ahead in the travel direction of the vehicle (S13: NO), the process proceeds to S2 without providing drive assistance.

In S14, the CPU 41 calculates the average value and the standard deviation of the deceleration end locations included in the learning data on the basis of the learning data determined to be provided ahead in the travel direction of the vehicle. In the embodiment, as discussed later, deceleration end locations stored for the same link and for the same direction and positioned within a predetermined range are stored as learning data for the same deceleration end location. In S14, the CPU 41 extracts from the learning DB 32 all the learning data provided in the travel direction of the vehicle and stored as the same deceleration end location, and calculates the average value and the standard deviation of the deceleration end locations included in the learning data. In the case where there is only one piece of such learning data, the process proceeds to S15 without performing the process in S14.

Figure 6:
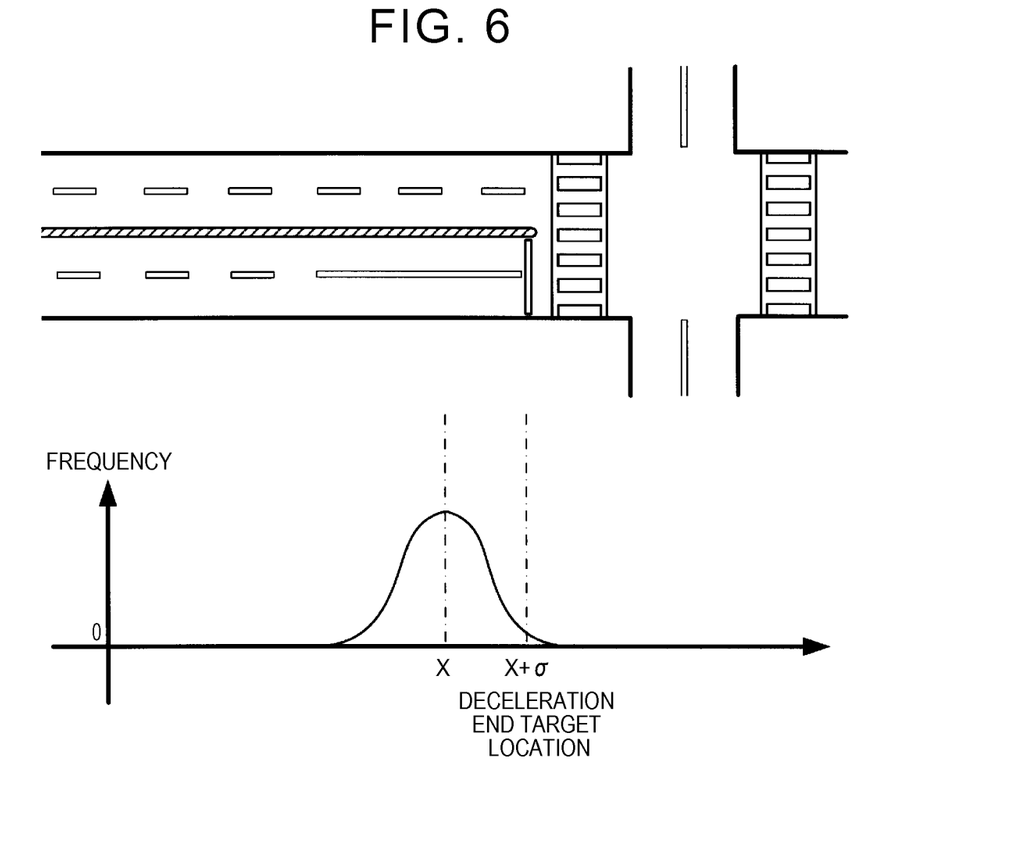
FIG. 6 illustrates a deceleration end target location.

Next, in S15, the CPU 41 sets a deceleration end target location which is a deceleration end location determined as the target when the vehicle performs decelerating action. Specifically, the CPU 41 sets the deceleration end target location to a location a distance corresponding to a standard deviation $\sigma$ ahead in the travel direction from a location X corresponding to the average value of the position coordinates of the deceleration end locations calculated in S14 as illustrated in FIG. 6. In the case where there is only one piece of such learning data, the deceleration end target location is set to the position coordinate of the deceleration end location in the learning data.

Subsequently, in S16, the CPU 41 acquires the current vehicle speed of the vehicle on the basis of the value detected by the vehicle speed sensor 22. In addition, the CPU 41 calculates the distance from the current position of the vehicle acquired in S11 to the deceleration end target location set in S15.

After that, in S17, the CPU 41 determines on the basis of the result of the calculation performed in S16 and the vehicle information acquired from the vehicle speed sensor 22 and the vehicle control ECU 19 whether or not the vehicle has passed an entry judgment location and the vehicle is performing decelerating action. The entry judgment location is determined as a location a predetermined distance before the deceleration end target location. The predetermined distance is determined as a distance that is longer than a distance L from a deceleration start location Y, which corresponds to the latest timing to start deceleration that enables drawing an ideal deceleration curve in the case where the vehicle is assumed to be stopped at a deceleration end target location Z as illustrated in FIG. 7, to the deceleration end target location Z, and may be 250 m, for example.

As in S2, the decelerating action which serves as a criterion for the determination performed in S17 includes deceleration by engine braking in addition to deceleration by operating a foot brake. Thus, it is determined that the vehicle is performing decelerating action in the case where the accelerator is turned off to decelerate by engine braking even if the foot brake is not operated.

In the case where it is determined that the vehicle has passed the entry judgment location and the vehicle is performing decelerating action (S17: YES), the process proceeds to S18. In the case where it is determined that the vehicle has not passed the entry judgment location or the vehicle is not performing decelerating action (S17: NO), the process proceeds to S19.

Figure 7:
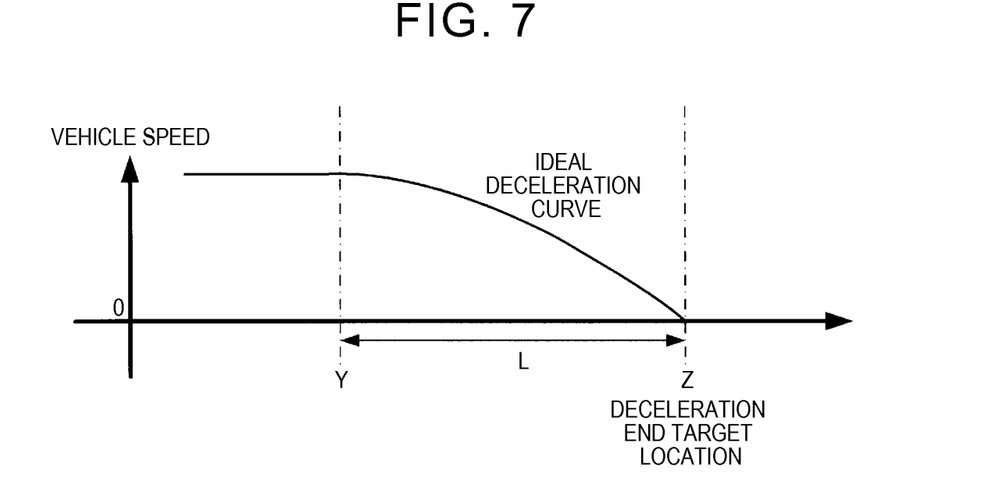
FIG. 7 illustrates an ideal deceleration curve.

In S18, the CPU 41 performs braking control for the vehicle such that the vehicle ends deceleration at the deceleration end target location in a manner that is as close as possible to the ideal deceleration curve illustrated in FIG. 7. Specifically, the CPU 41 transmits an instruction signal to the vehicle control ECU 19 via the CAN to perform braking control for the vehicle by performing a downshift or applying a brake. As a result, the vehicle can be decelerated to an appropriate speed at an appropriate degree of deceleration without being accelerated or decelerated abruptly. For hybrid vehicles and EV vehicles, in particular, the battery can be charged efficiently through regenerative braking.

In S19, meanwhile, the CPU 41 determines whether or not the vehicle has passed the deceleration end target location set in S15.

In the case where it is determined that the vehicle has passed the deceleration target location (S19: YES), the process proceeds to S2. In the case where it is determined that the vehicle has not passed the deceleration end target location (S19: NO), in contrast, the process returns to S16.

Figure 8:
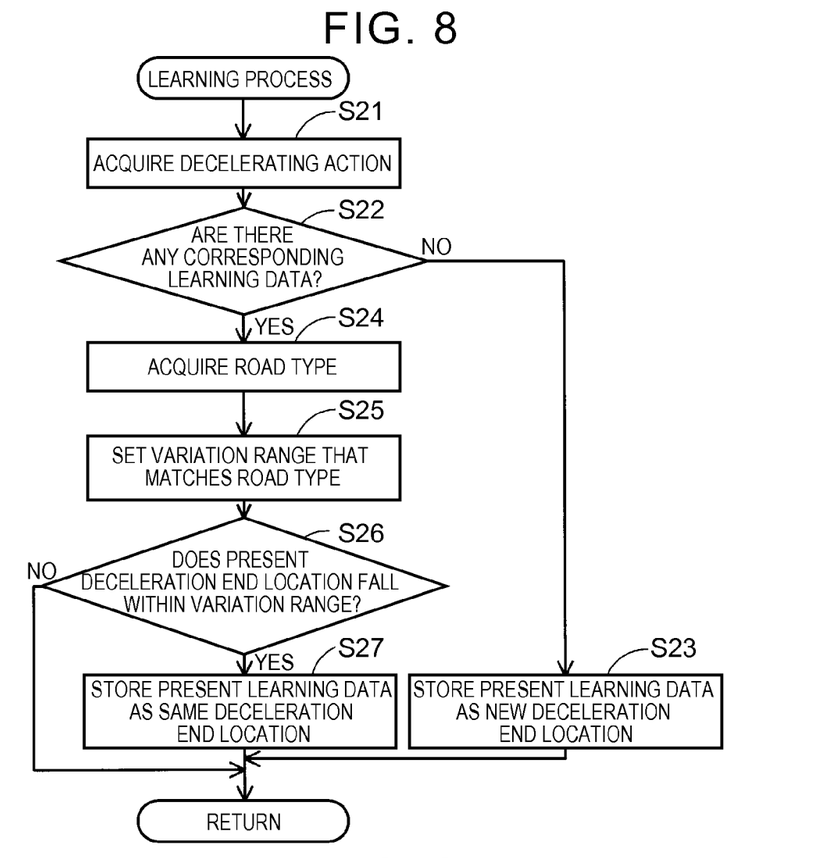
FIG. 8 is a flowchart of a sub process program of a learning process according to the embodiment.

Next, a sub process of the learning process executed in S3 will be described with reference to FIG. 8. FIG. 8 is a flowchart of a sub process program of the learning process.

First, in S21, the CPU 41 acquires the content of the decelerating action performed by the vehicle on the basis of the result of the detection performed by the vehicle speed sensor 22 and the vehicle information acquired from the vehicle control ECU 19. Specifically, the CPU 41 acquires the position coordinate of the deceleration end location at which the vehicle has ended deceleration (FIG. 2).

Next, in S22, the CPU 41 searches the learning DB 32 to determine whether or not learning data corresponding to the present decelerating action of the vehicle have already been stored in the learning DB 32. Specifically, the CPU 41 references the learning DB 32 (FIG. 3), and determines that learning data corresponding to the present decelerating action of the vehicle have already been stored in the learning DB 32 in the case where there are any learning data that store a deceleration end location for the same link and for the same direction.

In the case where it is determined that learning data corresponding to the present decelerating action of the vehicle have already been stored in the learning DB 32 (S22: YES), the process proceeds to S24. In the case where it is determined that learning data corresponding to the present decelerating action of the vehicle are not stored in the learning DB 32 (S22: NO), in contrast, the process proceeds to S23.

In S23, the CPU 41 stores the learning data for the deceleration control location specified in S21 in the learning DB 32 as learning data related to a new deceleration control location. Specifically, the coordinate of the deceleration end location is stored in association with the link and the travel direction in which the decelerating action was performed. A location a predetermined distance (e.g. 250 m) before the deceleration end location may be stored rather than the coordinate of the deceleration end location.

In S24, meanwhile, the CPU 41 acquires the road type (such as a narrow street, a general road, and a main road) of the road on which the deceleration control location specified in S21 is provided and the road type of a cross road that crosses the road. In the case where the deceleration control location is provided before a curve or near a toll gate and not near an intersection, there is no cross road, and thus only the road type of the road on which the deceleration control location is provided is acquired.

Next, in S25, the CPU 41 sets a variation range on the basis of the road type acquired in S24. The variation range prescribes a range, in which learning data are deemed as learning data related to the same deceleration end location. In the case where the vehicle performs decelerating action a plurality of times for the same link and for the same direction and deceleration end locations for each decelerating action fall within the set variation range, the plurality of deceleration end locations are stored as learning data for the same deceleration end location.

Figure 9:
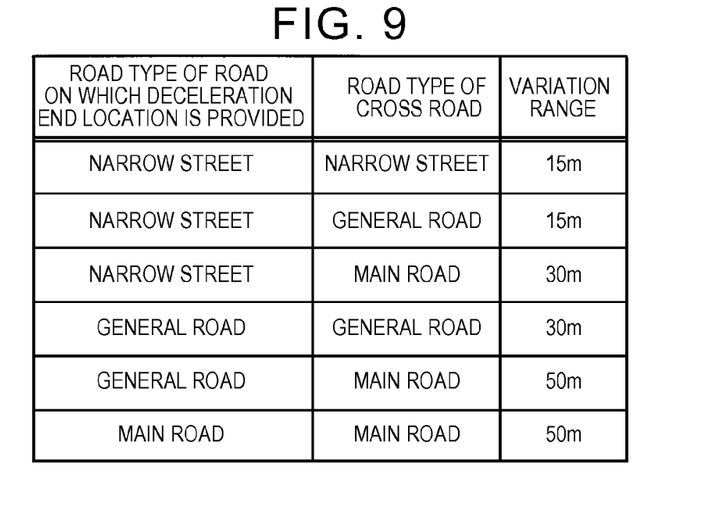
FIG. 9 illustrates a method of setting a variation range.

In S25, the CPU 41 sets a variation range in accordance with a combination of the road type (such as a narrow street, a general road, and a main road) of the road on which the deceleration control location is provided and the road type (such as a narrow street, a general road, and a main road) of a cross road that crosses the road as illustrated in FIG. 9. For example, in the case where the road type of the road on which the deceleration control location is provided is a narrow street and the road type of the cross road is a narrow street, the variation range is set to 15 m. In the case where the road type of the road on which the deceleration control location is provided is a main road and the road type of the cross road is a main road, the variation range is set to 50 m. The variation range illustrated in FIG. 9 is exemplary, and the values of the variation range can be changed as appropriate. However, it is desirable that the variation range should be set to be wider for a combination of roads for which it is predicted that there is a larger amount of traffic and a deceleration end location is more likely to vary (a combination that is closer to the lowest row of FIG. 9). In the case where the deceleration control location is not provided near an intersection and there is no cross road, the variation range is set in accordance with only the road type of the road on which the deceleration control location is provided, for example. For example, the variation range is set to 15 m for a narrow street, 30 m for a general road, and 50 m for a main road.

Subsequently, in S26, the CPU 41 searches the learning DB 32 to determine whether or not the deceleration end location of the present decelerated travel is provided within the variation range set in S25 from the deceleration end location included in the learning data corresponding to the present decelerating action of the vehicle already stored in the learning DB 32. In the case where there are a plurality of pieces of learning data corresponding to the present decelerating action of the vehicle already stored in the learning DB 32, it may be determined whether or not the deceleration end location of the present decelerated travel is provided within the variation range set in S25 from all of the deceleration end locations included in each piece of the learning data, or it may be determined whether or not the deceleration end location of the present decelerated travel is provided within the variation range set in S25 from at least one of the deceleration end locations.

In the case where it is determined that the deceleration end location of the present decelerated travel is provided within the variation range set in S25 from the deceleration end location included in the learning data corresponding to the present decelerating action of the vehicle already stored in the learning DB 32 (S26: YES), learning data for the deceleration control location specified in S21 are stored in the learning DB 32 as learning data related to the same deceleration control location together with the existing learning data determined to be provided within the variation range (S27). Specifically, the coordinate of the deceleration end location is stored in association with the link and the travel direction in which the decelerating action was performed. A location a predetermined distance (e.g. 250 m) before the deceleration end location may be stored rather than the coordinate of the deceleration end location.

In the case where it is determined that the deceleration end location of the present decelerated travel is not provided within the variation range set in S25 from the deceleration end location included in the learning data corresponding to the present decelerating action of the vehicle already stored in the learning DB 32 (S26: NO), on the other hand, learning data based on the present decelerating action are stored as learning data for a different deceleration end location. The process may be ended without storing such learning data in the learning DB 32.

Figure 10:
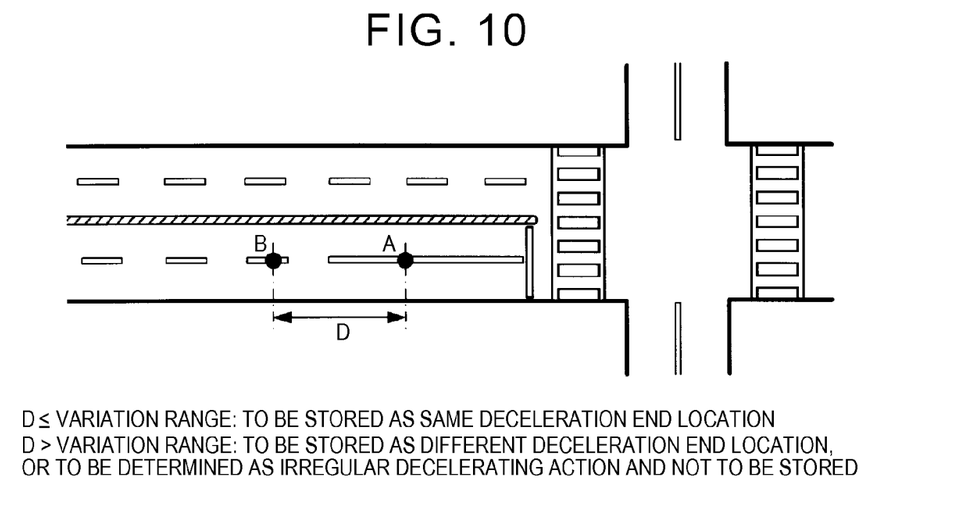
FIG. 10 illustrates a method of storing learning data.

For example, a case where decelerating action is newly performed at a deceleration end location B with a deceleration end location A stored as learning data as illustrated in FIG. 10 will be described. In the case where a distance D from the deceleration end location A to the deceleration end location B is equal to or less than the variation range, the deceleration end location A and the deceleration end location B are stored in the learning data as the same deceleration end location. As a result, in the case where the vehicle travels along the same link and in the same direction the next and subsequent times, a deceleration end target location is set using the average and the standard deviation of the deceleration end location A and the deceleration end location B in the vehicle control process (FIG. 5) discussed earlier.

In the case where the distance D from the deceleration end location A to the deceleration end location B is not equal to or less than the variation distance, on the other hand, the deceleration end location B is estimated to be based on decelerating action based on a different factor or irregular decelerating action, and the deceleration end location B is stored as learning data for a different deceleration end location or is not stored as learning data. As a result, in the case where the vehicle travels along the same link and in the same direction the next and subsequent times, a deceleration end target location is set using only the deceleration end location A in the vehicle control process (FIG. 5) discussed earlier.

With the navigation apparatus 1, the drive assist method performed using the navigation apparatus 1, and the computer program executed by the navigation apparatus 1 according to the embodiment, as described in detail above, in the case where a vehicle performs decelerating action, a deceleration end location at which the vehicle ends deceleration in the decelerating action is specified (S21); a variation range that matches the road type of a road on which the deceleration end location is provided is set (S25); and in the case where learning data stored in the learning DB 32 already include learning data for a different deceleration end location provided within the variation range set from the present deceleration end location, such deceleration end locations are stored as learning data for the same deceleration end location (S27). Thus, it is possible to appropriately store a deceleration end location at which a vehicle ends deceleration in decelerating action as learning data, while eliminating irregular decelerating action, even for a road on which the content of the decelerating action tends to vary because of a disturbance such as a road with a large amount of traffic. In addition, a deceleration end target location is set on the basis of a history of deceleration end locations stored as the same deceleration end location, and drive of the vehicle is assisted such that deceleration of the vehicle ends at the deceleration end target location (S18). Thus, it is possible to set a deceleration end target location to an appropriate position on the basis of learning data even for a road on which the content of the decelerating action tends to vary because of a disturbance such as a road with a large amount of traffic. As a result, the vehicle can be decelerated to an appropriate speed at an appropriate degree of deceleration without being accelerated or decelerated abruptly. For hybrid vehicles and EV vehicles, in particular, the battery can be charged efficiently through regenerative braking.

Braking control is performed such that the vehicle ends deceleration at the deceleration end target location in the case where the deceleration end target location is provided ahead in the travel direction of the vehicle and the vehicle performs decelerating action. Thus, it is possible to appropriately assist decelerating action of the vehicle in the case where such action is performed. That is, unnecessary assistance is not provided in a situation in which it is not necessary for the vehicle to perform decelerating action.

The deceleration end location is a location at which the vehicle is stopped or a location at which the vehicle is turned from deceleration into acceleration. Thus, it is possible to set an appropriate deceleration end target location irrespective of whether or not the vehicle is finally stopped.

The range, in which deceleration end locations are deemed as the same deceleration end location, is set on the basis of a combination of the road type of the road on which the deceleration end location is provided and the road type of a cross road that crosses the road. Thus, it can be determined from the road types whether or not the road is a road on which the content of the decelerating action tends to vary, and it is possible to appropriately set a range, in which deceleration end locations are deemed as the same deceleration end location, on the basis of the result of the determination.

The deceleration end target location is set to a location a distance corresponding to the standard deviation ahead in the travel direction from the average value of the history of deceleration end locations stored as the same deceleration end location. Thus, it is possible to set an appropriate deceleration end target location even in the case where the content of the decelerating action varies. In addition, the deceleration end target location is set ahead in the travel direction with respect to the average value. Thus, it is possible to prevent the location at which deceleration is ended (e.g. the position at which the vehicle is stopped) from being provided ahead in the travel direction with respect to the deceleration end target location, that is, to prevent reacceleration of the vehicle, in the case where drive assistance for the vehicle is provided.

The range, in which deceleration end locations are deemed as the same deceleration end location, is set to be wider as the road on which the deceleration end location is provided is of a road type with a larger amount of traffic. Thus, it is possible to set the range, in which deceleration end locations are deemed as the same deceleration end location, to be wider for a road of a road type for which the content of the decelerating action tends to vary. Thus, it is possible to set a deceleration end target location in consideration of variations in content of the decelerating action.

It should be understood that the present subject matter is not limited to the embodiment described above, and that various improvements and modifications may be made without departing from the scope and spirit thereof.

In the embodiment, for example, braking control for the vehicle is performed as drive assistance for the vehicle. However, display guidance or audio guidance may be provided. Specifically, guidance that indicates the timing and the amount of deceleration may be provided such that the vehicle decelerates along an ideal deceleration curve before reaching the deceleration end target location.

In the embodiment, the variation range is set on the basis of a combination of the road type (such as a narrow street, a general road, and a main road) of the road on which the deceleration control location is provided and the road type of a cross road that crosses the road. However, the variation range may be set on the basis of only the road type of the road on which the deceleration control location is provided. Alternatively, the variation range may be set on the basis of information (e.g. the average vehicle speed and the number of lanes of the road) that allows prediction on the amount of traffic besides the road type.

The drive assist process program (FIGS. 4, 5, and 8) according to the embodiment is executed by the navigation ECU 13 of the navigation apparatus. However, the drive assist process program may be executed by the vehicle control ECU 19. Alternatively, the process may be performed by a plurality of ECUs in a distributed manner.

The present embodiment may be applied to various devices that can control the vehicle via the vehicle control ECU 19 besides the navigation apparatus. For example, the present embodiment may also be applied to in-vehicle devices other than the navigation apparatus, and portable terminals such as a cellular phone, a smartphone, and a PDA, personal computers, and so forth (hereinafter referred to as portable terminal etc.). The present embodiment may also be applied to a system composed of a server and a portable terminal etc. In this case, each step of the vehicle control process program (FIGS. 4, 5, and 8) discussed above may be performed by any of the server and the portable terminal etc. In the case where the present embodiment is applied to the portable terminal etc., drive assistance may be provided to vehicles other than automobiles such as a two-wheeled vehicle driven by a user of the portable terminal etc., for example.

While a drive assist system according to a specific embodiment of the has been described above, the drive assist system may be configured as described below, and the following effect can be achieved in such cases.

For example, a first configuration is as follows.

The drive assist performs braking control such that the vehicle ends deceleration at the deceleration end target location in the case where the deceleration end target location is provided ahead in the travel direction of the vehicle and the vehicle performs decelerating action.

With the drive assist system configured as described above, braking control is performed such that the vehicle ends deceleration at the deceleration end target location in the case where the deceleration end target location is provided ahead in the travel direction of the vehicle and the vehicle performs decelerating action. Thus, it is possible to appropriately assist decelerating action of the vehicle in the case where such action is performed. That is, unnecessary assistance is not provided in a situation in which it is not necessary for the vehicle to perform decelerating action.

A second configuration is as follows.

The deceleration end location is a location at which the vehicle is stopped or a location at which the vehicle is turned from deceleration into acceleration.

With the drive assist system configured as described above, the deceleration end location is a location at which the vehicle is stopped or a location at which the vehicle is turned from deceleration into acceleration. Thus, it is possible to set an appropriate deceleration end target location irrespective of whether or not the vehicle is finally stopped.

A third configuration is as follows.

The deceleration end location is specified near an intersection, and the predetermined range is set on the basis of a combination of the road type of the road on which the specified deceleration end location is provided and a road type of a cross road that crosses the road.

With the drive assist system configured as described above, the range, in which deceleration end locations are deemed as the same deceleration end location, is set on the basis of a combination of the road type of the road on which the deceleration end location is provided and the road type of a cross road that crosses the road. Thus, it can be determined from the road types whether or not the road is a road on which the content of the decelerating action tends to vary, and it is possible to appropriately set a range, in which deceleration end locations are deemed as the same deceleration end location, on the basis of the result of the determination.

A fourth configuration is as follows.

The target setting module calculates an average value and a standard deviation of the history of deceleration end locations stored as the same deceleration end location, and sets the deceleration end target location to a location a distance corresponding to the standard deviation ahead in the travel direction from the average value of the history of deceleration end locations stored as the same deceleration end location.

With the drive assist system configured as described above, the deceleration end target location is set to a location a distance corresponding to the standard deviation ahead in the travel direction from the average value of the history of deceleration end locations stored as the same deceleration end location. Thus, it is possible to set an appropriate deceleration end target location even in the case where the content of the decelerating action varies. In addition, the deceleration end target location is set ahead in the travel direction with respect to the average value. Thus, it is possible to prevent the location at which deceleration is ended (e.g. the position at which the vehicle is stopped) from being provided ahead in the travel direction with respect to the deceleration end target location, that is, to prevent reacceleration of the vehicle, in the case where drive assistance for the vehicle is provided.

A fifth configuration is as follows.

The predetermined range is set to be wider as the road on which the specified deceleration end location is provided is of a road type with a larger amount of traffic.

With the drive assist system configured as described above, the range, in which deceleration end locations are deemed as the same deceleration end location, is set to be wider as the road on which the deceleration end location is provided is of a road type with a larger amount of traffic. Thus, it is possible to set the range, in which deceleration end locations are deemed as the same deceleration end location, to be wider for a road of a road type for which the content of the decelerating action tends to vary. Thus, it is possible to set a deceleration end target location in consideration of variations in content of the decelerating action.

DESCRIPTION OF THE REFERENCE NUMERALS

1 NAVIGATION APPARATUS
13 NAVIGATION ECU
19 VEHICLE CONTROL ECU
41 CPU
42 RAM
43 ROM

The invention claimed is:

1. A deceleration end location storage system comprising:
determining a position of a vehicle using one of a plurality of sensors disposed in the vehicle;
decelerating action detection module for detecting decelerating action of the vehicle using one of the plurality of sensors disposed in the vehicle;
deceleration end location specifying module for specifying a deceleration end location using the position of the vehicle at which the vehicle ends deceleration as detected by the decelerating action detection module; and
deceleration end location storage unit for storing the specified deceleration end location, wherein:
the deceleration end location storage unit
searches for a different deceleration end location provided within a predetermined range from the specified deceleration end location from deceleration end locations which have already been stored in the case where the deceleration end location is specified, and
stores the specified deceleration end location as the same deceleration end location as the different deceleration end location in the case where there is any different deceleration end location found within the predetermined range as a result of the search;
in the case where the deceleration end location is not near an intersection, the predetermined range is set to different ranges depending on a road type of a road on which the specified deceleration end location is provided, and
in the case where the deceleration end location is near the intersection, the predetermined range is set on the basis of a combination of the road type of the road on which the specified deceleration end location is provided and a road type of a cross road that crosses the road.

2. A drive assist system comprising:
determining a position of a vehicle using one of a plurality of sensors disposed in the vehicle;
decelerating action detection module for detecting decelerating action of the vehicle using one of the plurality of sensors disposed in the vehicle;
deceleration end location specifying module for specifying a deceleration end location using the position of the vehicle at which the vehicle ends deceleration as detected by the decelerating action detection module; and
deceleration end location storage unit for storing the specified deceleration end location;
target setting module for setting, for a road, a deceleration end target location which is a deceleration end location determined as a target when the vehicle performs decelerating action on the basis of a history of stored deceleration end locations; and
drive assist for providing drive assistance for the vehicle such that the vehicle ends deceleration at the deceleration end target location in the case where the deceleration end target location is provided ahead in a travel direction of the vehicle, wherein:
the deceleration end location storage unit
searches for a different deceleration end location provided within a predetermined range from the specified deceleration end location from deceleration end locations which have already been stored in the case where the deceleration end location is specified, and
stores the specified deceleration end location as the same deceleration end location as the different deceleration end location in the case where there is any different deceleration end location found within the predetermined range as a result of the search;
in the case where the deceleration end location is not near an intersection, the predetermined range is set to different ranges depending on a road type of a road on which the specified deceleration end location is provided,
in the case where the deceleration end location is near the intersection, the predetermined range is set on the basis of a combination of the road type of the road on which the specified deceleration end location is provided and a road type of a cross road that crosses the road; and
the target setting module sets the deceleration end target location on the basis of the history of deceleration end locations stored as the same deceleration end location.

3. The drive assist system according to claim 2, wherein the drive assist performs braking control such that the vehicle ends deceleration at the deceleration end target location in the case where the deceleration end target location is provided ahead in the travel direction of the vehicle and the vehicle performs decelerating action.

4. The drive assist system according to claim 2, wherein the deceleration end location is a location at which the vehicle is stopped or a location at which the vehicle is turned from deceleration into acceleration.

5. The drive assist system according to claim 2, wherein:
the deceleration end location is specified near an intersection; and
the predetermined range is set on the basis of a combination of the road type of the road on which the specified deceleration end location is provided and a road type of a cross road that crosses the road.

6. The drive assist system according to claim 2, wherein the target setting module
calculates an average value and a standard deviation of the history of deceleration end locations stored as the same deceleration end location, and
sets the deceleration end target location to a location corresponding to the standard deviation ahead in the travel direction from the average value of the history of deceleration end locations stored as the same deceleration end location.

7. The drive assist system according to claim 2, wherein the predetermined range is set to be wider as the road on which the specified deceleration end location is provided is of a road type with a larger amount of traffic.

8. A drive assist method comprising:
a position determining step of determining a position of a vehicle using one of a plurality of sensors disposed in the vehicle;
a decelerating action detection step of detecting decelerating action of the vehicle using one of the plurality of sensors disposed in the vehicle;
a deceleration end location specifying step of specifying a deceleration end location using the position of the vehicle at which the vehicle ends deceleration as detected in the decelerating action detection step;
a deceleration end location storage step of storing the specified deceleration end location;
a target setting step of setting, for a road, a deceleration end target location which is a deceleration end location determined as a target when the vehicle performs decelerating action on the basis of a history of stored deceleration end locations; and
a drive assist step of providing drive assistance for the vehicle such that the vehicle ends deceleration at the deceleration end target location in the case where the deceleration end target location is provided ahead in a travel direction of the vehicle, wherein:
the deceleration end location storage step includes
searching for a different deceleration end location provided within a predetermined range from the specified deceleration end location from deceleration end locations which have already been stored in the case where the deceleration end location is specified, and
storing the specified deceleration end location as the same deceleration end location as the different deceleration end location in the case where there is any different deceleration end location found within the predetermined range as a result of the search;
in the case where the deceleration end location is not near an intersection, the predetermined range is set to different ranges depending on a road type of a road on which the specified deceleration end location is provided,
in the case where the deceleration end location is near the intersection, the predetermined range is set on the basis of a combination of the road type of the road on which the specified deceleration end location is provided and a road type of a cross road that crosses the road; and the target setting step includes setting the deceleration end target location on the basis of the history of deceleration end locations stored as the same deceleration end location.

9. A computer-readable medium for storing a program for causing a computer to implement:
a position determining function of determining a position of a vehicle using one of a plurality of sensors disposed in the vehicle;
a decelerating action detection function of detecting decelerating action of the vehicle using one of the plurality of sensors disposed in the vehicle;
a deceleration end location specifying function of specifying a deceleration end location using the position of the vehicle at which the vehicle ends deceleration is detected by the decelerating action detection function;
a deceleration end location storage function of storing the specified deceleration end location;
a target setting function of setting, for a road, a deceleration end target location which is a deceleration end location determined as a target when the vehicle performs decelerating action on the basis of a history of stored deceleration end locations; and
a drive assist function of providing drive assistance for the vehicle such that the vehicle ends deceleration at the deceleration end target location in the case where the deceleration end target location is provided ahead in a travel direction of the vehicle, wherein:
the deceleration end location storage function includes
searching for a different deceleration end location provided within a predetermined range from the specified deceleration end location from deceleration end locations which have already been stored in the case where the deceleration end location is specified, and
storing the specified deceleration end location as the same deceleration end location as the different deceleration end location in the case where there is any different deceleration end location found within the predetermined range as a result of the search;
in the case where the deceleration end location is not near an intersection, the predetermined range is set to different ranges depending on a road type of a road on which the specified deceleration end location is provided,
in the case where the deceleration end location is near the intersection, the predetermined range is set on the basis of a combination of the road type of the road on which the specified deceleration end location is provided and a road type of a cross road that crosses the road; and
the target setting function includes setting the deceleration end target location on the basis of the history of deceleration end locations stored as the same deceleration end location.

* * * * *